United States Patent
Yamamoto et al.

(10) Patent No.: US 9,404,563 B2
(45) Date of Patent: Aug. 2, 2016

(54) POWER TRANSMITTING SYSTEM OF A VEHICLE

(71) Applicant: TOYOTA JIDOSHA KABUSHIKI KAISHA, Toyota-shi, Aichi (JP)

(72) Inventors: Kozo Yamamoto, Nagoya (JP); Michio Yoshida, Susono (JP); Hirofumi Nakada, Toyota (JP); Kenji Matsuo, Toyota (JP); Mitsuhiro Fukao, Toyota (JP); Shuji Moriyama, Nagakute (JP); Yuji Iwatsuru, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/715,076

(22) Filed: May 18, 2015

(65) Prior Publication Data

US 2015/0354682 A1 Dec. 10, 2015

(30) Foreign Application Priority Data

May 21, 2014 (JP) .................................. 2014-105717

(51) Int. Cl.
| | |
|---|---|
| *F16H 37/08* | (2006.01) |
| *F16H 63/34* | (2006.01) |
| *F16H 61/22* | (2006.01) |
| *F16H 37/02* | (2006.01) |

(52) U.S. Cl.
CPC ........ *F16H 37/0846* (2013.01); *F16H 37/0833* (2013.01); *F16H 61/22* (2013.01); *F16H 63/34* (2013.01); *F16H 37/022* (2013.01); *F16H 2037/026* (2013.01); *F16H 2200/2094* (2013.01)

(58) Field of Classification Search
None
See application file for complete search history.

(56) References Cited

U.S. PATENT DOCUMENTS

| | | | | |
|---|---|---|---|---|
| 3,943,798 A | * | 3/1976 | Sato .................... | B60K 17/3467 475/204 |
| 4,392,394 A | * | 7/1983 | Hofbauer ................. | B60K 5/04 475/204 |
| 5,954,612 A | * | 9/1999 | Baxter, Jr. .......... | B60K 17/3467 180/247 |
| 2015/0087463 A1 | | 3/2015 | Nakagawa et al. | |

FOREIGN PATENT DOCUMENTS

WO 2013176208 A1 11/2013

* cited by examiner

*Primary Examiner* — Dirk Wright
(74) *Attorney, Agent, or Firm* — Oliff PLC

(57) ABSTRACT

Power system including differential-mechanism, clutch-mechanism, power-mechanism and dog-clutch disposed between an input rotary member to receive drive-force from a drive power source and output rotary-member to transmit drive-force to drive-wheels, the differential-mechanism including an input rotary element, output rotary element and reaction rotary element; the clutch-mechanism connecting two rotary elements of the input, output and reaction rotary elements of the differential-mechanism, to each other, the power-mechanism having predetermined gear ratio, and dog-clutch selectively placing a power path between the output rotary element and output rotary-member, in power transmitting state and power cutoff state; transmitting drive-force to drive-wheels while the clutch-mechanisms and dog-clutch are placed in engaged states. The dog-clutch engagement retainer mechanism holds the dog-clutch in engaged state while the power system turns in parking-lock-position inhibiting output rotary-member motion, and switching the dog-clutch from engaged to released when the power system switches to non-parking-lock position permitting the output rotary-member motion.

6 Claims, 5 Drawing Sheets

IN PARKING LOCK POSITION

KEPT IN SYNCHRONIZED STATE

POWER TRANSMITTING SYSTEM OF A VEHICLE

CROSS REFERENCE TO RELATED APPLICATION

The present application claims the priority from Japanese Patent Application No. 2014-105717 filed on May 21, 2014, the disclosure of which is herein incorporated by reference in its entirety.

BACKGROUND OF THE INVENTION

1. Field of the Invention

The present invention relates to a power transmitting system of a vehicle, wherein a differential mechanism, a power transmitting mechanism and a dog clutch are disposed between a drive power source and drive wheels.

2. Description of Related Art

There is well known a power transmitting system of a vehicle, comprising a differential mechanism, a clutch mechanism, a power transmitting mechanism and a dog clutch which are disposed between an input rotary member provided to receive a drive force from a drive power source of the vehicle and an output rotary member provided to transmit the drive force to drive wheels of the vehicle. The differential mechanism includes an input rotary element, an output rotary element and a reaction rotary element, and the clutch mechanism selectively connects two rotary elements of the input, output and reaction rotary elements of the differential mechanism, to each other. The power transmitting mechanism has a predetermined gear ratio, and the dog clutch is configured to selectively place a power transmitting path between the differential mechanism and the output rotary member, in a power transmitting state and a power cutoff state. WO/2013/176208 A discloses an example of such a vehicle power transmitting system, which has a power transmitting path provided with a continuously variable transmission mechanism, and a power transmitting path provided with a gear mechanism. These two power transmitting paths are arranged in parallel with each other between an input shaft and an output shaft of the power transmitting system. In the power transmitting path provided with the gear mechanism, a forward/reverse switching mechanism, a gear train and a dog clutch (claw clutch or positive clutch) are disposed in this order of description between the input and output shafts, in a direction from the input shaft toward the output shaft. The forward/reverse switching mechanism is provided with a planetary gear set, and a forward drive clutch for selectively connecting two rotary elements of the planetary gear set to each other. This vehicle power transmitting system can be configured such that a speed ratio of the power transmitting path provided with the gear mechanism is higher than a highest speed ratio (corresponding to the lowest gear position) of the power transmitting path provided with the continuously variable transmission mechanism. This configuration permits the vehicle to be driven with a large drive force upon starting of the vehicle, for instance, when the forward drive clutch and the dog clutch are both placed in engaged states to select the power transmitting path provided with the gear mechanism.

By the way, it is considered to control the dog clutch such that the dog clutch is held in its released state while an engine is held at rest, in view of a possibility that the vehicle is towed, and is switched to its engaged state when the engine is started. According to this control of the dog clutch, there is a risk of a failure to bring the dog clutch into the engaged state (namely, an "up-lock" of the dog clutch) due to a failure of meshing of spline teeth of the dog clutch (synchro-mesh mechanism) in abutting contact of tooth faces with each other, which may take place upon a so-called "garage shifting" action (from a parking position P to a drive position D, for example) of a shift lever just after the engine is started. This phenomenon results in a failure to speedily start the vehicle. Where the power transmitting path provided with the gear mechanism has a high speed ratio and the dog clutch is controlled to be held in the engaged state while the engine is held at rest, so that the dog clutch is ready for starting the vehicle, on the other hand, a rotary motion the speed of which is raised when the vehicle is towed is input from the output rotary member to the differential mechanism, so that the differential mechanism has a large difference among rotating speeds of its rotary elements, giving rise to a risk of deterioration of durability of the differential mechanism due to excessively high rotating speeds of the rotary elements such as a pinion gear. In this respect, it is noted that the problems described above had not been publicly recognized at the time the present invention was made.

SUMMARY OF THE INVENTION

The present invention was made in view of the background art described above. It is therefore an object of the present invention to provide a power transmitting system of a vehicle, which permits speedy starting of the vehicle after switching of the power transmitting system from its parking lock position to its non-parking-lock position, and which prevents a risk of deterioration of durability of a differential mechanism during towing or traction of the vehicle.

The object indicated above is achieved according to a first aspect of the present invention, which provides a power transmitting system of a vehicle, comprising a differential mechanism, a clutch mechanism, a power transmitting mechanism and a dog clutch which are disposed between an input rotary member provided to receive a drive force from a drive power source of the vehicle and an output rotary member provided to transmit the drive force to drive wheels of the vehicle, the above-described differential mechanism including an input rotary element, an output rotary element and a reaction rotary element, the above-described clutch mechanism selectively connecting two rotary elements of the above-described input, output and reaction rotary elements of the above-described differential mechanism, to each other, the above-described power transmitting mechanism having a predetermined gear ratio, and the above-described dog clutch being configured to selectively place a power transmitting path between the above-described output rotary element and the above-described output rotary member, in a power transmitting state and a power cutoff state, and wherein the above-described drive force is transmitted to the above-described drive wheels while both of the above-described clutch mechanism and the above-described dog clutch are placed in engaged states, the power transmitting system further comprising a dog-clutch engagement retainer mechanism configured to mechanically hold the above-described dog clutch in the engaged state while the power transmitting system is placed in a parking lock position for mechanically inhibiting a rotary motion of the above-described output rotary member, and to switch the above-described dog clutch from the engaged state to a released state when the power transmitting system is switched to a non-parking-lock position for mechanically permitting the rotary motion of the output rotary member.

According to the first aspect of the invention described above, the dog clutch is mechanically held in the engaged state while the power transmitting system is placed in the parking lock position, so that a synchromesh mechanism and a hub sleeve of the dog clutch remain aligned in phase with each other and are ready for the dog clutch to be placed in the engaged state (i.e., remain aligned as the dog clutch is released), even if the dog clutch is once switched to the released state when the vehicle is started after the power transmitting system is switched to the non-parking-lock position, whereby the dog clutch can be subsequently speedily brought into the engaged state, without occurrence of the so-called "up-lock". Accordingly, the vehicle can be speedily started after the power transmitting system is switched to the non-parking-lock position. In addition, the dog clutch is not mechanically held in the engaged state while the power transmitting system is placed in the non-parking-lock position, so that it is possible to avoid a large difference among rotating speeds of the rotary elements of the differential mechanism in the released state of the dog clutch when the vehicle is towed in the non-parking-lock position (neutral position) of the power transmitting system. It is therefore possible to prevent a risk of deterioration of durability of the differential mechanism during towing of the vehicle.

According to a second aspect of the invention, the power transmitting system according to the first aspect of the invention further comprises: a clutch switching member configured to switch the above-described dog clutch between the engaged state and the released state; and a parking lock switching member configured to switch the power transmitting system between the parking lock position and the non-parking-lock position. The dog-clutch engagement retainer mechanism mechanically holds the above-described dog clutch in the engaged state, by holding the above-described clutch switching member and the above-described parking lock switching member in engagement with each other while the clutch switching member is located at a position for placing the dog clutch in the engaged state and while the parking lock switching member is located at a position for placing the power transmitting system in the parking lock position. According to this second aspect of the invention, the dog-clutch engagement retainer mechanism mechanically holds the dog clutch in the engaged state in an adequate manner, while the power transmitting system is placed in the parking lock position, and switches the dog clutch in an adequate manner from the engaged state to the released state when the power transmitting system is switched to the non-parking-lock position.

The object indicated above is also achieved according to a third aspect of the invention, which provides a power transmitting system of a vehicle, comprising a differential mechanism, a clutch mechanism, a power transmitting mechanism, a dog clutch, a clutch switching member, and a parking lock switching member, which are disposed between an input rotary member provided to receive a drive force from a drive power source of the vehicle and an output rotary member provided to transmit the drive force to drive wheels of the vehicle, the above-described differential mechanism including an input rotary element, an output rotary element and a reaction rotary element, the above-described clutch mechanism selectively connecting two rotary elements of the above-described input, output and reaction rotary elements of the above-described differential mechanism, to each other, the above-described power transmitting mechanism having a predetermined gear ratio, the above-described dog clutch being configured to selectively place a power transmitting path between the above-described output rotary element and the above-described output rotary member, in a power transmitting state and a power cutoff state, the above-described clutch switching member being configured to switch the above-described dog clutch between an engaged state and a released state, and the above-described parking lock switching member being configured to switch the power transmitting system between a parking lock position for mechanically inhibiting a rotary motion of the above-described output rotary member, and a non-parking-lock position for mechanically permitting the rotary motion of the above-described output rotary member, and wherein the above-indicated drive force is transmitted to the above-described drive wheels while the above-described clutch mechanism is placed in an engaged state and while the above-described dog clutch is placed in the engaged state, the power transmitting system being characterized in that: the above-described clutch switching member includes a protrusion; the above-described parking lock switching member includes a hook portion which is held in engagement with the above-described protrusion of the above-described clutch switching member located at a position for placing the above-described dog clutch in the engaged state when the power transmitting system is placed in the parking lock position, and is not held in engagement with the above-described protrusion when the power transmitting system is placed in the non-parking-lock position; and the above-described protrusion prevents a movement of the above-described clutch switching member toward a position for placing the above-described dog clutch in the released state, when the protrusion is held in engagement with the above-described hook portion of the above-described parking lock switching member.

According to the third aspect of the invention, the dog clutch is mechanically held in the engaged state while the power transmitting system is placed in the parking lock position, so that a synchromesh mechanism and a hub sleeve of the dog clutch remain aligned in phase with each other and are ready for the dog clutch to be placed in the engaged state (i.e., remain aligned as the dog clutch is released), even if the dog clutch is once switched to the released state when the vehicle is started after the power transmitting system is switched to the non-parking-lock position, whereby the dog clutch can be subsequently speedily brought into the engaged state, without occurrence of the so-called "up-lock". Accordingly, the vehicle can be speedily started after the power transmitting system is switched to the non-parking-lock position. In addition, the dog clutch is not mechanically held in the engaged state while the power transmitting system is placed in the non-parking-lock position, so that it is possible to avoid a large difference among rotating speeds of the rotary elements of the differential mechanism in the released state of the dog clutch when the vehicle is towed in the non-parking-lock position (neutral position) of the power transmitting system. It is therefore possible to prevent a risk of deterioration of durability of the differential mechanism during towing of the vehicle.

According to a fourth aspect of the invention, the power transmitting system according to the third aspect of the invention is configured such that the above-described protrusion functions to provide a ratchet device which permits a movement of the above-described clutch switching member relative to the above-described hook portion toward the position for placing the above-described dog clutch in the engaged state, and prevents the movement of the clutch switching member toward the position for placing the dog clutch in the released state. According to this fourth aspect of the invention, the dog clutch is mechanically held in the engaged state in an adequate manner while the power transmitting system is placed in the parking lock position, and the dog clutch is switched in an adequate manner from the engaged state to the released state when the power transmitting system is switched to the non-parking-lock position. In addition, the dog clutch can be switched from the released state to the engaged state even while the parking lock switching member is placed in the position for placing the power transmitting system in the parking lock position, so that the dog clutch can be switched from the released state to the engaged state when the power transmitting system is switched to the parking lock position after the vehicle has been towed.

According to a fifth aspect of the invention, the power transmitting system according to any one of the first through fourth aspect of the invention further comprises a continuously variable transmission disposed in parallel with the above-described power transmitting mechanism, between the above-described input rotary member and the above-described output rotary member, and a first clutch configured to selectively place a first power transmitting path through which the drive force is transmitted from the above-described drive power source to the above-described drive wheels through the above-described continuously variable transmission, in a power transmitting state and in a power cutoff state. The power transmitting system is further configured such that the power transmitting mechanism has at least one gear position, and the above-described differential mechanism is disposed in a second power transmitting path through which the drive force is transmitted from the drive power source to the drive wheels through the above-described power transmitting mechanism, the above-described clutch mechanism selectively places the above-described second power transmitting path in a power transmitting state and in a power cutoff state, and the above-described dog clutch is disposed between the above-described clutch mechanism and the above-described output rotary member, to selectively place the above-described second power transmitting path in the power transmitting and power cutoff states. In the power transmitting system according to this fifth aspect of the invention wherein the continuously variable transmission and the power transmitting mechanism are disposed in parallel with each other between the input and output rotary members, the vehicle can be speedily started after the power transmitting system is switched to the non-parking-lock position, and the deterioration of durability of the differential mechanism during towing of the vehicle can be avoided.

DETAILED DESCRIPTION OF A PREFERRED EMBODIMENT

Figure 1:
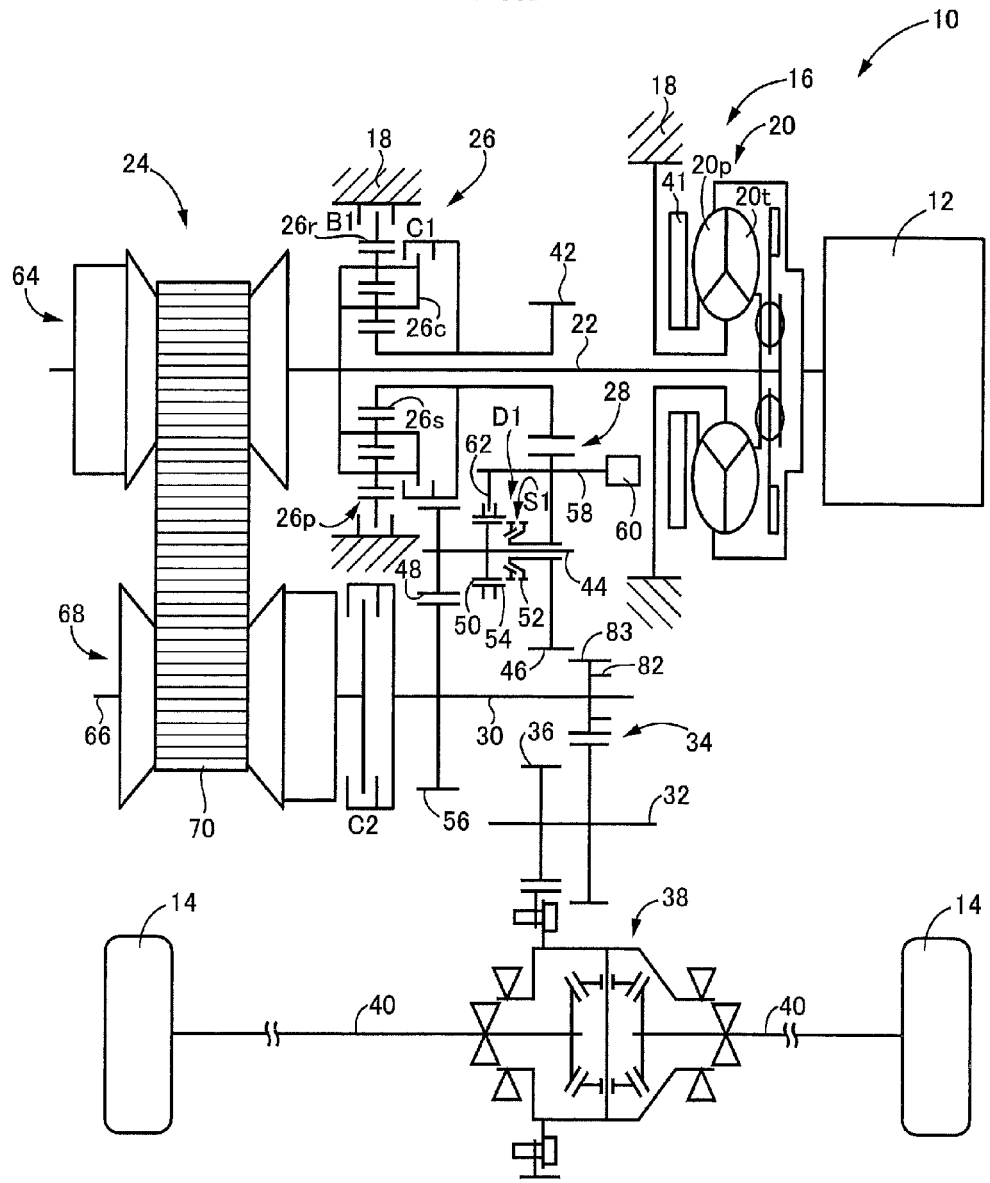
FIG. 1 is a schematic view showing an arrangement of a vehicle to which the present invention is applicable.

Referring to the drawings, a preferred embodiment of the present invention will be described in detail.

Embodiment

FIG. 1 is the schematic view showing an arrangement of a vehicle 10 to which the present invention is applicable. As shown in FIG. 1, the vehicle 10 is provided with a vehicle drive power source in the form of an engine 12, drive wheels 14, and a power transmitting system 16 disposed between the engine 12 and the drive wheels 14. The power transmitting system 16 includes, within a stationary member in the form of a housing 18; a fluid-operated power transmitting device in the form of a known torque converter 20 connected to the engine 12; an input shaft 22 connected to the torque converter 20; a continuously variable transmission mechanism in the form of a known belt-type continuously variable transmission 24 (hereinafter referred as a continuously variable transmission 24) connected to the input shaft 22; a forward/reverse switching device 26 connected to the input shaft 22; a power transmitting mechanism in the form of a gear mechanism 28 connected to the input shaft 22 through the forward/reverse switching device 26 and disposed in parallel with the continuously variable transmission 24; an output shaft 30 which is an output rotary member of both of the continuously variable transmission 24 and the gear mechanism 28; a counter shaft 32; a speed reducing gear device 34 consisting of a pair of gears which mesh with each other and which are respectively rotated with the output shaft 30 and the counter shaft 32; a differential gear device 38 connected to the counter shaft 32 such that a differential gear 36 of the differential gear device 38 is rotated with the counter shaft 32; and a pair of axles 40 connected to the differential gear device 38. In the power transmission system 16 constructed as described above, a drive power, force or torque generated by the engine 12 is transmitted to the pair of drive wheels 14 through the torque converter 20, the continuously variable transmission 24 or the forward/reverse switching device 26 and the gear mechanism 28, the speed reducing gear device 34, the differential gear device 38, and the axles 40.

As described above, the power transmitting system 16 is provided with the continuously variable transmission 24 and the gear mechanism 28, which are disposed in parallel with each other, between the engine 12 (or the input shaft 22 which is an input rotary member receiving a drive force of the engine 12) and the drive wheels 14 (or the output shaft 30 which is an output rotary member from which the drive force of the engine 12 is transmitted to the drive wheels 14). Thus, the power transmitting system 16 has a first power transmitting path through which the drive force of the engine 12 is transmitted through the continuously variable transmission 24 from the input shaft 22 to the drive wheels 14 (that is, to the output shaft 30), and a second power transmitting path through which the drive force of the engine 12 is transmitted through the gear mechanism 28 from the input shaft 22 to the drive wheels 14 (that is, to the output shaft 30). In the power transmitting system 16, one of the first and second power transmitting paths is selectively placed in a power transmitting state depending upon a running state of the vehicle 10. The power transmitting system 16 is provided with clutches for selectively placing the first and second power transmitting paths in the power transmitting state. Namely, the power transmitting system 16 is provided with a first clutch in the form of a CVT drive clutch C2 for placing the first power transmitting path in the power transmitting state or a power cutoff state, and a second clutch in the form of a forward drive clutch C1 and a reverse drive brake B1 for placing the second power transmitting path in the power transmitting state or a power cutoff state. The CVT drive clutch C2, the forward drive clutch C1 and the reverse drive brake B1 are power connecting/disconnecting devices, each of which is a known hydraulically operated frictional coupling device (friction clutch) which is placed in an engaged state by a hydraulic actuator. The forward drive clutch C1 and the reverse drive brake B1 are elements of the forward/reverse switching device 26 which will be described in detail.

The torque converter 20 is disposed radially outwardly of, and coaxially with the input shaft 22, and is provided with a pump impeller 20p connected to the engine 12, and a turbine impeller 20t connected to the input shaft 22. A mechanically operated oil pump 41 is connected to the pump impeller 20p, and is operated by a rotary motion of the pump impeller 20p driven by the engine 12, to generate a pressurized working oil used to change a speed ratio of the continuously variable transmission 24, to give a tension to a transmission belt 70 of the continuously variable transmission 24, to selectively place the above-described clutches C1 and C2 and brake B1 in their engaged and released states, and to lubricate various portions of the power transmitting system 16.

The forward/reverse switching device 26 is disposed in the above-described second power transmitting path, radially outwardly of, and coaxially with the input shaft 22, and is constituted principally by a planetary gear set 26p of a double-pinion type, the forward drive clutch C1 and the reverse drive brake B1. The planetary gear set 26p is a differential mechanism including three rotary elements, that is, an input rotary element in the form of a carrier 26c, an output rotary element in the form of a sun gear 26s, and a reaction rotary element in the form of a ring gear 26r. The carrier 26c is integrally connected to the input shaft 22, and the ring gear 26r is selectively fixed to the housing 18 through the reverse drive brake B1, while the sun gear 26s is fixed to a small-diameter gear 42 which is disposed radially outwardly of, and coaxially of the input shaft 22 such that the sun gear 26s is rotatable relative to the input shaft 22. The carrier 26c and the sun gear 26s are selectively connected to each other through the forward drive clutch C1. Namely, the forward drive clutch C1 functions as a clutch mechanism configured to selectively connect two rotary elements of the three rotary elements of the planetary gear set 26p, while the reverse drive brake B1 functions as a clutch mechanism configured to selectively fix the reaction rotary element of the planetary gear set 26p to the housing 18.

The gear mechanism 28 includes the above-indicated small-diameter gear 42, and a large-diameter gear 46 which meshes with the small-diameter gear 42 and which is disposed radially outwardly of, and coaxially with a gear mechanism counter shaft 44 such that the large-diameter gear 46 is rotatable relative to the gear mechanism counter shaft 44. Thus, the gear mechanism 28 functions as a power transmitting mechanism having a predetermined gear ratio (one constant gear ratio or gear stage). An idler gear 48 is fixedly and coaxially mounted on the gear mechanism counter shaft 44 such that the idler gear 48 is rotated with the gear mechanism counter shaft 44. Further, a dog clutch (claw clutch or positive clutch) D1 is disposed radially outwardly of the gear mechanism counter shaft 44, between the large-diameter gear 46 and the idler gear 48, for selectively connecting these large-diameter and idler gears 46 and 48 to each other. Accordingly, the dog clutch D1 is a dog clutch configured to selectively place a power transmitting path between the sun gear 26s and the output shaft 30 of the power transmitting system 16, in a power transmitting state and a power cutoff state, and functions as a third clutch configured to selectively place the above-described second power transmitting path between the forward drive clutch C1 and the output shaft 30, in the power transmitting state and the power cutoff state. The idler gear 48 meshes with an output gear 56 having a larger diameter than the idler gear 48. The output gear 56 is fixedly and coaxially mounted on the output shaft 30 such that the output gear 56 is rotated with the output shaft 30.

Described more specifically, the dog clutch D1 includes a first gear 50 formed integrally with the gear mechanism counter shaft 44, a second gear 52 formed integrally with the large-diameter gear 46, and a hub sleeve 54 having internal teeth which are engageable with the first and second gears 50 and 52. Further, the dog clutch D1 includes a known synchronizing mechanism in the form of a synchro-mesh mechanism S1 for synchronizing rotary motions of the first and second gears 50 and 52 when these first and second gears 50 and 52 are connected to each other. The large-diameter gear 46 and the gear mechanism counter shaft 44 are connected to each other when the hub sleeve 54 is held in engagement with the first and second gears 50 and 52. The dog clutch D1 is selectively placed in its engaged and released states, by axial movements of the hub sleeve 54 by a shift fork 62 fixed to a fork shaft 58 and operation of the fork shaft 58 by an actuator 60. The shift fork 62 functions as a clutch switching member configured to place the dog clutch D1 in the engaged and released states. In the power transmitting system 16, a forward driving power transmitting path (or a reverse driving power transmitting path) is established in the above-described second power transmitting path, to transmit the drive force of the engine 12 to the output shaft 30 through the input shaft 22 and the gear mechanism 28 when the forward drive clutch C1 (or the reverse drive brake B1) and the dog clutch D1 are both placed in the engaged states. In the power transmitting system 16, the second power transmitting path is placed in a neutral state (power cutoff state) when at least both of the forward drive clutch C1 and the reverse drive brake B1 are placed in the released states, or when at least the dog clutch D1 is placed in the released state.

The continuously variable transmission 24 is disposed in a power transmitting path between the input shaft 22 and the output shaft 30. The continuously variable transmission 24 is provided with a primary pulley 64 fixedly mounted on the input shaft 22, a secondary pulley 68 fixedly mounted on a rotary shaft 66 disposed coaxially with the output shaft 30, and the above-indicated transmission belt 70 connecting the primary and secondary pulleys 64 and 68. A drive force is transmitted between the primary and secondary pulleys 64 and 68 through forces of friction between the transmission belt 70 and the pulleys 64, 68. An effective diameter of each of the pulleys 64 and 68, which is defined by widths of V-grooves of the pulleys 64, 68 for engagement with the transmission belt 70, is variable so that a speed ratio (gear ratio) γ of the continuously variable transmission 24 (=an input shaft speed Ni/an output shaft speed No) is variable. The CVT drive clutch C2 is disposed on one of opposite sides of the continuously variable transmission 24 which is on the side of the drive wheels 14, that is, disposed between the secondary pulley 68 and the output shaft 30, to selectively connect and disconnect the secondary pulley 68 (rotary shaft 66) and the output shaft 30 to and from each other. In the power transmitting system 16, a power transmitting path is established in the above-described first power transmitting path, to transmit the drive force of the engine 12 to the output shaft 30 through the input shaft 22 and the continuously variable transmission 24 when the CVT drive clutch C2 is placed in the engaged state. In the power transmitting system 16, the first power transmitting path is placed in a neutral state (power cutoff state) when the CVT drive clutch C2 is placed in the released state.

Figure 2:
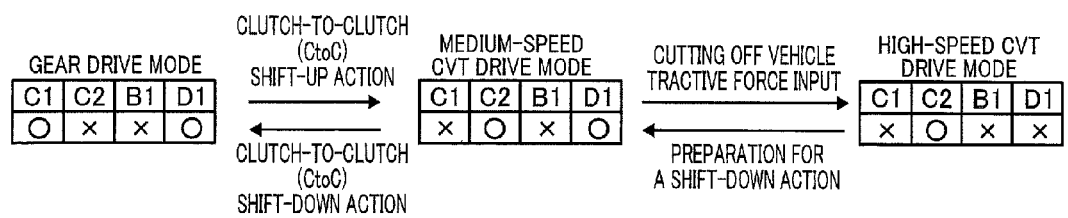
FIG. 2 is a view for explaining operations of a power transmitting system of the vehicle to switch its drive mode.

Operations of the power transmitting system 16 will be described by reference to FIG. 2, which is the view for explaining the operations of the power transmitting system 16 to switch its drive mode. FIG. 2 includes tables indicating different combinations of the operating states of the forward drive clutch C1, CVT drive clutch C2, reverse drive brake B1 and dog clutch D1, which combinations correspond to respective different drive modes of the power transmitting system 16. In the tables, a "o" mark represents the engaged state, while a "x" mark represents the released state.

Initially, a gear drive mode of the power transmitting system 16 will be described. In the gear drive mode, the drive force of the engine 12 is transmitted to the output shaft 30 through the gear mechanism 28, that is, through the second power transmitting path. As indicated in FIG. 2, this gear drive mode is established to drive the vehicle 10 in the forward direction, in the engaged states of the forward drive clutch C1 and the dog clutch D1 and in the released states of the CVT drive clutch C2 and the reverse drive brake B1.

Described more specifically, the rotary elements of the planetary gear set 26p of the forward/reverse switching device 26 are rotated as a unit, in the engaged state of the forward drive clutch C1, so that the small-diameter gear 42 is rotated with the input shaft 22 at the same speed, while at the same time the large-diameter gear 46 meshing with the small-diameter gear 42 is rotated. In the engaged state of the dog clutch D1, the large-diameter gear 46 and the gear mechanism counter shaft 44 are connected to each other, so that the gear mechanism counter shaft 44 and the idler gear 48 are rotated. Since the output gear 56 is held in engagement with the idler gear 48, the output shaft 30 formed integrally with the output gear 56 is rotated. In the engaged states of the forward drive clutch C1 and the dog clutch D1, therefore, the drive force of the engine 12 is transmitted to the output shaft 30 through the torque converter 20, the forward/reverse switching device 26, the gear mechanism 28, the idler gear 48, etc. In this respect, it is noted that the gear drive mode is established to drive the vehicle 10 in the reverse direction, in the engaged states of the reverse drive brake B1 and the dog clutch D1, and in the released states of the CVT drive clutch C2 and the forward drive clutch C1.

Then, a high-speed CVT drive mode and a medium-speed CVT drive mode of the power transmitting system 16 will be described. In the CVT drive modes, the drive force of the engine 12 is transmitted to the output shaft 30 through the continuously variable transmission 24, that is, through the first power transmitting path. As indicated in FIG. 2, the high-speed CVT drive mode is established in the engaged state of the CVT drive clutch C2 and in the released states of the forward drive clutch C1, the reverse drive brake B1 and the dog clutch D1.

Described more specifically, the secondary pulley 68 and the output shaft 30 are connected to each other, and are rotated together, in the engaged state of the CVT drive clutch C2. In the engaged state of the CVT drive clutch C2, therefore, the drive force of the engine 12 is transmitted to the output shaft 30 through the torque converter 20 and the continuously variable transmission 24. The dog clutch D1 is held in the released state in the high-speed CVT drive mode, for the purpose of avoiding dragging of the gear mechanism 28, etc. in the high-speed CVT drive mode, and preventing rotary motions of the rotary elements (such as the pinion gear) of the gear mechanism 28 and the planetary gear set 26p at excessively high speeds.

The gear drive mode described above is selected while the vehicle 10 is held stationary or when the vehicle 10 is driven at a relatively low running speed. The second power transmitting path has a gear ratio γ1 (namely, a gear ratio EL established by the gear mechanism 28) which is determined to be higher (i.e. to be lower vehicle running speed) than a maximum gear ratio value γmax of the continuously variable transmission 24, which value γmax corresponds to the lowest rotating speed of the secondary pulley. Namely, the vehicle running speed corresponding to the gear ratio γ1 is lower than the vehicle running speed corresponding to the maximum gear ratio value γmax of the continuously variable transmission 24. For instance, the gear ratio γ1 corresponds to a gear ratio of a first-speed gear position of the power transmitting system 16, while the maximum gear ratio value γmax of the continuously variable transmission 24 corresponds to a gear ratio of a second-speed gear position of the power transmitting system 16. Accordingly, the gear drive mode and the high-speed CVT drive mode are selected according to shifting lines defined by a shifting map used to shift a known step-variable automatic transmission between its first-speed and second-speed gear positions. Further, in the high-speed CVT drive mode, the gear ratio γ of the continuously variable transmission 24 is controlled on the basis of a running condition of the vehicle 10 as represented by an operation amount θacc of an accelerator pedal and a running speed V of the vehicle 10, and according to a known CVT shifting method (continuously variable shifting operation). The vehicle drive mode is switched from the gear drive mode to the high-speed CVT drive mode, or from the high-speed CVT drive mode to the gear drive mode, via the medium-speed CVT drive mode also indicated in FIG. 2.

When the vehicle drive mode is switched from the gear drive mode to the high-speed CVT drive mode, for example, the vehicle drive mode is first switched from the gear drive mode to the medium-speed CVT drive mode, that is, the forward drive clutch C1 placed in the engaged state to establish the gear drive mode is brought into the released state, and the CVT drive clutch C2 placed in the released state to establish the gear drive mode is brought into the engaged state, while the dog clutch D1 is kept in the engaged state, so that the medium-speed CVT drive mode is temporarily established by a so-called "clutch-to-clutch (CtoC) shifting operation" in which a releasing action of the forward drive clutch C1 and an engaging action of the CVT drive clutch C2 are concurrently performed. As a result, the power transmitting system 16 is switched from the second power transmitting path to the first power transmitting path, so that the power transmitting system 16 is substantially shifted up. After the second power transmitting path is established (after the vehicle drive mode is once switched to the high-speed CVT drive mode), the vehicle drive mode is then switched from the medium-speed CVT drive mode to the high-speed CVT drive mode, by bringing the dog clutch D1 into the released state to avoid an undesired dragging of the gear mechanism 28, etc. (to cut off a tractive or towing force input as indicated in FIG. 2), and to prevent the rotary motions of the rotary elements of the planetary gear set 26p at excessively high speeds. Thus, the dog clutch D1 functions as a tractive force input cutoff clutch for cutting off the tractive force input to the power transmitting system 16 through the drive wheels 14.

When the vehicle drive mode is switched from the high-speed CVT drive mode to the gear drive mode, on the other hand, the vehicle drive mode is first switched from the high-speed CVT drive mode to the medium-speed CVT drive mode, that is, the dog clutch D1 placed in the released state to establish the high-speed CVT drive mode is brought into the engaged state, while the CVT drive clutch C2 is kept in the engaged state, so that the medium-speed CVT drive mode is temporarily established (for "preparation for a shift-down action" indicated in FIG. 2). In this medium-speed CVT drive mode, a rotary motion is transmitted also to the sun gear 26s of the planetary gear set 26p through the gear mechanism 28. Then, the vehicle drive mode is switched from the medium-speed CVT drive mode to the gear drive mode by a clutch-to-clutch (CtoC) shifting operation in which a releasing action of the CVT drive clutch C2 and an engaging action of the forward drive clutch C1 are concurrently performed. As a result, the power transmitting system 16 is switched from the first power transmitting path to the second power transmitting path, so that the power transmitting system 16 is substantially shifted down.

Figure 4:
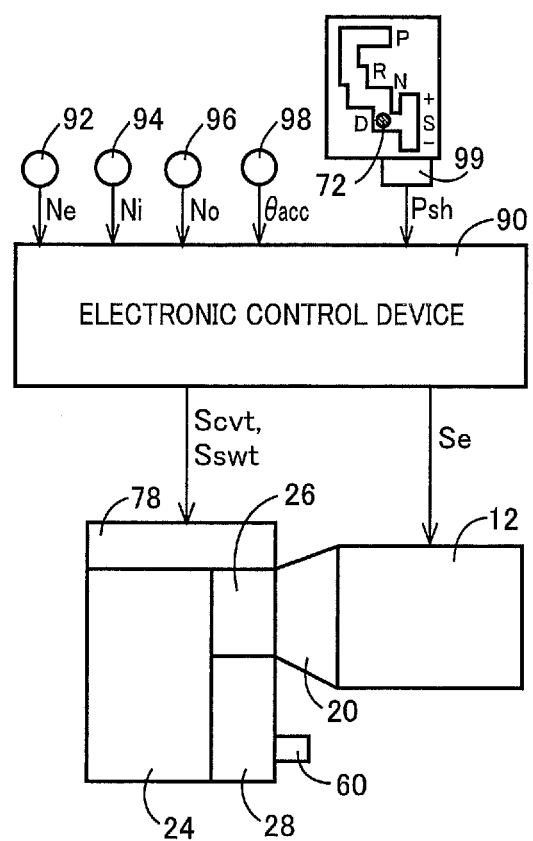
FIG. 4 is a functional block diagram showing major portions of a control system provided for controlling the vehicle, and major portions of the vehicle to be controlled by the control system.

As shown in FIG. 4, the vehicle 10 is provided with a manually operated member in the form of a shift lever 72 having a plurality of shift positions Psh, such as a parking position P, a reverse drive position R, a neutral position N and a forward drive position D. An operation of the shift lever 72 causes a rotary motion of a shaft 74 (shown in FIGS. 5A and 5B) and a pivotal motion of a detent lever 76 (shown in FIGS. 5A and 5B) connected to the shaft 74, through a linkage mechanism including a link and a cable etc., so that a spool of a manual valve (not shown) connected to the detent lever 76 is axially moved to control mutual communications of respective oil passages in a hydraulic control unit 78 of the power transmitting system 16 depending on the shift position Psh.

When the shift lever 72 is operated to the parking position P, the power transmitting system 16 is placed in a parking lock position P ("position" is also referred as "range" in the description of the power transmitting system 16) in which each of the first and second power transmitting paths is placed in the power cutoff state, while a rotary motion of a parking gear 82 (namely, a rotary motion of an output gear 83 (shown in FIG. 1) formed integrally with the parking gear 82) and rotary motions of the drive wheels 14 are mechanically prevented by a parking lock mechanism 80 (shown in FIG. 3) provided in the vehicle 10. The output gear 83 is one of a pair of gears of the speed reducing gear device 34, which one gear is fixedly mounted on the output shaft 30. In the parking lock position P, therefore, a rotary motion of the output shaft 30 is mechanically prevented. When the shift lever 72 is operated to the reverse drive position R, the power transmitting system 16 is placed in a reverse drive position R in which the vehicle 10 can be driven in the reverse direction. When the shift lever 72 is operated to the neutral position N, the power transmitting system 16 is placed in a neutral position N in which each of the first and second power transmitting paths is placed in the power cutoff state. When the shift lever 72 is operated to the forward drive position D, the power transmitting system 16 is placed in a forward drive position D in which the vehicle 10 can be driven in the forward direction. The forward drive position D and the reverse drive position R are vehicle drive positions selected to drive the vehicle 10, while the parking lock position P and the neutral position N are non-vehicle-drive positions selected when the vehicle 10 is not driven. The forward and reverse drive positions D and R, and the neutral position N are non-parking-lock positions for mechanically permitting the rotary motion of the output shaft 30.

Figure 3:
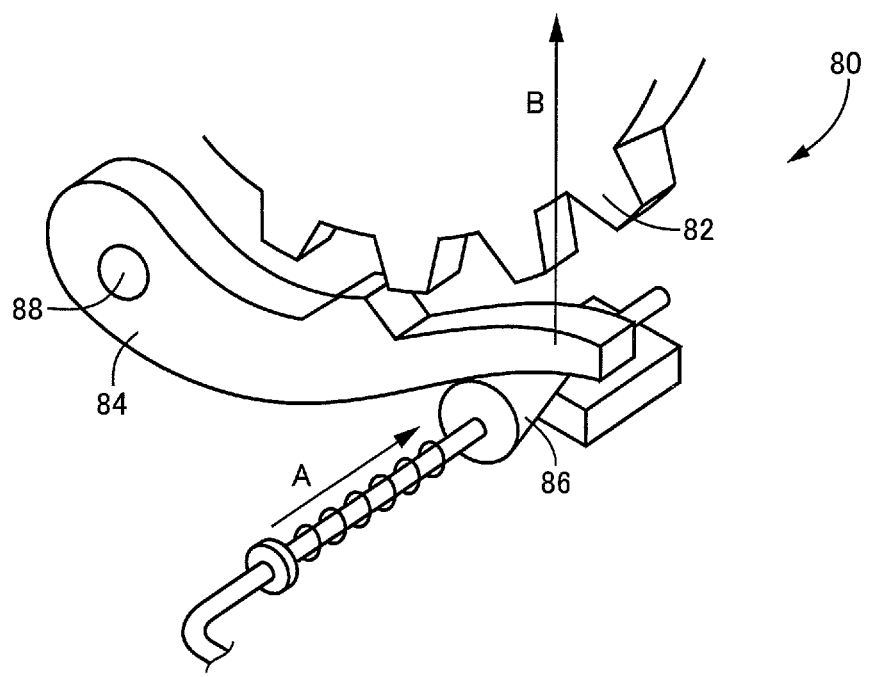
FIG. 3 is a perspective view showing an example of a parking lock mechanism provided to mechanically inhibit rotary motions of drive wheels of the vehicle.

As shown in FIG. 3, the parking lock mechanism 80 is provided with the above-described parking gear 82, a locking pawl 84 as locking teeth engageable with the parking gear 82 to prevent the rotary motion of the output gear 83, a locking cam 86, and a support pin 88. The locking pawl 84 is pivotable about the support pin 88 by the locking cam 86. The locking cam 86 is mechanically movable in a direction indicated by an arrow A (indicated in FIG. 3), by the detent lever 76 (shown in FIGS. 5A and 5B) which is pivoted when the shift lever 72 is operated. Namely, when the shift lever 72 is operated to the parking position P, the locking cam 86 is moved in the direction of the arrow A, so that the locking pawl 84 is pivoted upwards in a direction indicated by an arrow B, as shown in FIG. 3, for engagement with the parking gear 82 to mechanically prevent the rotary motions of the drive wheels 14 connected to the parking gear 82, so that the power transmitting system 16 is placed in the parking lock position P. In the present embodiment, the detent lever 76 functions as a parking lock switching member provided to switch the power transmitting system 16 between the parking lock position P and the non-parking-lock positions.

FIG. 4 is the functional block diagram showing major portions of a control system provided for controlling the vehicle 10, and major portions of the vehicle 10 to be controlled by the control system. As shown in FIG. 4, the control system includes an electronic control device 90 which includes a shifting control portion for selectively establishing the different vehicle drive modes of the power transmitting system 16 described above. The functional block diagram of FIG. 4 shows input and output signals to and from the electronic control device 90, and the portions of the vehicle 10 to which the output signals are applied from the electronic control device 90. The electronic control device 90 includes a so-called microcomputer incorporating a CPU, a RAM, a ROM and an input-output interface. The CPU performs signal processing operations to implement various controls of the vehicle 10 according to programs stored in the ROM, while utilizing a temporary storage function of the RAM. For example, the electronic control device 90 implements an output control of the engine 12, a shifting control and a belt tension control of the continuously variable transmission 24, and a drive mode switching control of the power transmitting system 16. The electronic control device 90 includes independent control units such as an engine control unit for controlling the engine 12, and a shifting control unit for controlling the power transmitting system 16.

The electronic control device 90 receives various input signals from various sensors, such as: an output signal of an engine speed sensor 92 indicative of an operating speed Ne of the engine 12; an output signal of an input shaft speed sensor 94 indicative of an input shaft speed Ni; an output signal of an output shaft speed sensor 96 indicative of an output shaft speed No corresponding to the vehicle running speed V; an output signal of an accelerator operation amount sensor 98 indicative of the operation amount θacc of the accelerator pedal; and an output signal of a shift position sensor 99 indicative of the selected operating position Psh of the shift lever 72. The electronic control device 90 generates various output signals such as: engine output control signals Se for implementing the output control of the engine 12; hydraulic control command signals Scvt for hydraulic controls for shifting the continuously variable transmission 24; and hydraulic control command signals Sswt for implementing the drive mode switching control of the power transmitting system 16, more specifically, for controlling the forward/reverse switching device 26, the CVT drive clutch C2, and the dog clutch D1. The hydraulic control command signals Sswt generated by the electronic control device 90 include command signals to be applied to the hydraulic control unit 78 for controlling solenoid-operated valves provided to control a hydraulic pressure to be applied to the actuator 60 for operating the hub sleeve 54.

By the way, while the engine 12 is held at rest before the engine 12 is started, the oil pump 41 is also held at rest, so that the dog clutch D1 cannot be switched between the engaged and released states, by applying and releasing the hydraulic pressure to and from the actuator 60. If the dog clutch D1 is placed in the engaged state while the engine 12 is held at rest, the pinion gear of the planetary gear set 26p, for example, is rotated at an excessively high speed with the tractive force input through the drive wheels 14 when the vehicle 10 is towed, so that there is a risk of deterioration of durability of the planetary gear set 26p. In view of a possibility that the vehicle 10 is towed, it is desirable to hold the dog clutch D1 in the released state while the engine 12 is held at rest. Since a gear ratio at the lowest gear of the power transmitting system 16 is equal to the gear ratio EL established by the gear mechanism 28, on the other hand, it is desirable to start the vehicle 10 in the gear drive mode established in the engaged states of both of the forward drive clutch C1 and the dog clutch D1. In view of a so-called "garage shifting" action of the power transmitting system 16 from the parking lock position P to the forward drive position D just after the engine 12 is started, it is desirable to hold the dog clutch D1 in the engaged state while the engine 12 is held at rest, so that the vehicle 10 can be speedily started. Thus, whether it is desirable to hold the dog clutch D1 in the engaged state or in the released state while the engine 12 is held at rest depends upon whether the vehicle 10 is towed while the engine 12 is held at rest, or whether the garage shifting action of the shift lever 72 takes place just after the engine 12 is started. The power transmitting system 16 according to the present embodiment of the invention is configured to suitably deal with both the towing of the vehicle 10 and the garage shifting of the shift lever 72.

Namely, the power transmitting system 16 includes a dog-clutch engagement retainer mechanism 100 (shown in FIGS. 5A, 5B, 6A, and 6B) configured to mechanically hold the dog clutch D1 in the engaged state while the power transmitting system 16 is placed in the parking lock position P, and to switch said dog clutch from the engaged state to the released state when the power transmitting system is switched to any one of the non-parking-lock positions.

Figure 5A:
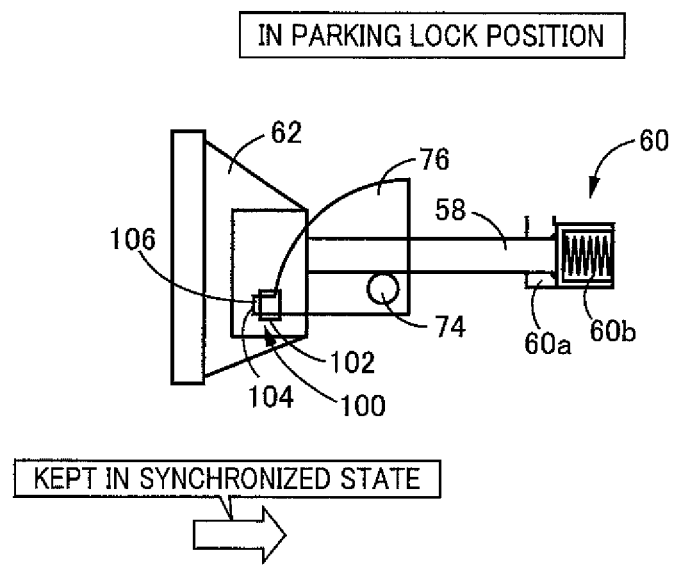
FIGS. 5A and 5B are views illustrating a dog-clutch engagement retainer mechanism when the power transmitting system is placed in a parking lock position.
Figure 5B:
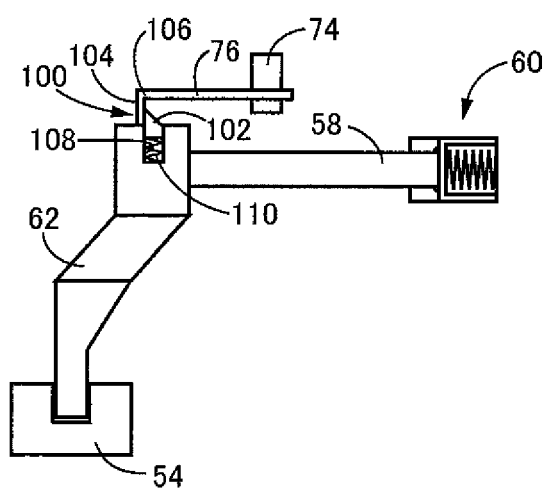
Figure 6A:
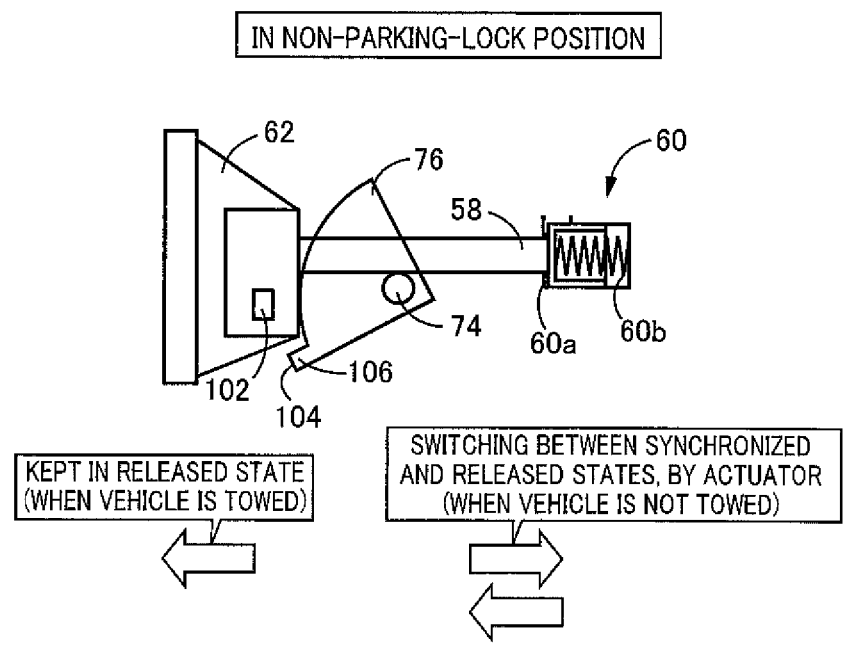
FIGS. 6A and 6B are views illustrating the dog-clutch engagement retainer mechanism when the power transmitting system is placed in a non-parking-lock position.
Figure 6B:
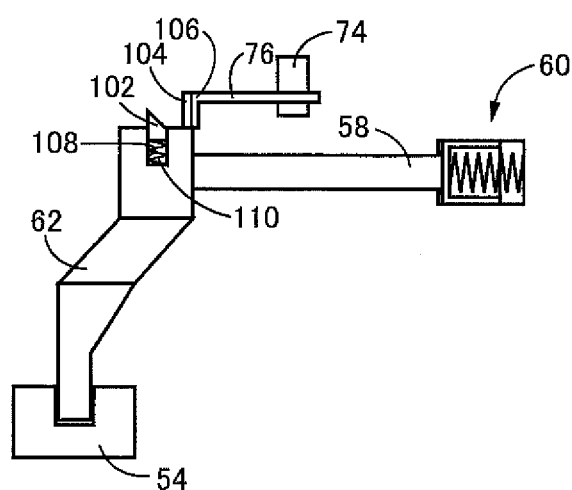

FIGS. 5A, 5B, 6A, and 6B are views illustrating the dog-clutch engagement retainer mechanism 100. The dog-clutch engagement retainer mechanism 100 is placed in an operating state shown in FIGS. 5A and 5B, when the power transmitting system 16 is placed in the parking lock position P, and in an operating state shown in FIGS. 6A and 6B when the power transmitting system is placed in any one of the non-parking-lock positions. FIGS. 5A and 6A are plan views of the dog-clutch engagement retainer mechanism 100, while FIGS. 5B and 6B are side elevational views. In FIGS. 5A, 5B, 6A, and 6B the power transmitting system 16 and the dog-clutch engagement retainer mechanism 100 are shown partly in cross section, and connections of the system 16 and the mechanism 100 with respect to the other members are not shown.

The shift fork 62 is moved to a position for placing the dog clutch D1 in the engaged state when predetermined hydraulic pressure is applied to an oil chamber 60a of the actuator 60 as shown in FIGS. 5A and 5B and is moved to a position for placing the dog clutch D1 in the released state, with a biasing force of a spring 60b disposed in the actuator 60, when the predetermined hydraulic pressure is released from the oil chamber 60a, as shown in FIGS. 6A and 6B.

The shift fork 62 has a protrusion 102. The detent lever 76 has a hook portion 104 which is held in engagement with the protrusion 102 of the shift fork 62 located at the position for placing the dog clutch D1 in the engaged state when the power transmitting system 16 is placed in the parking lock position P, and is not held in engagement with the protrusion 102 when the power transmitting system 16 is placed in the non-parking-lock positions. The dog-clutch engagement retainer mechanism 100 comprises the protrusion 102 and the hook portion 104. The dog-clutch engagement retainer mechanism 100 mechanically holds the dog clutch D1 in the engaged state, by holding the shift fork 62 located at the position for placing the dog clutch D1 in the engaged state, in engagement with the detent lever 76 located at an angular position for placing the power transmitting system 16 in the parking lock position P, as shown in FIGS. 5A and 5B.

The detent lever 76 has a generally sectoral flat plate which is pivoted about the shaft 74. The hook portion 104 has a projection 106 formed at an end part of an arc of the detent lever 76 which is located close to the protrusion 102 when the detent lever 76 is located at the angular position for placing the power transmitting system 16 in the parking lock position P. The projection 106 extends radially outwardly of the detent lever 76 and has an end portion which is partially bent toward the protrusion 102.

The protrusion 102 prevents a movement of the shift fork 62 to a position for placing the dog clutch D1 in the released state when the protrusion 102 is held in engagement with the hook portion 104. Described more specifically, the protrusion 102 and a spring 110 (described below) functions as a ratchet device which permits a movement of the shift fork 62 relative to the hook portion 104 toward the position for placing the dog clutch D1 in the engaged state, but inhibits the movement of the shift fork 62 relative to the hook portion 104 toward the position for placing the dog clutch D1 in the released state. The shift fork 62 has a hole 108 formed in a part of a surface opposed to the detent lever 76, which part is close to the projection 106 of the detent lever 76 located at the angular position for placing the power transmitting system 16 in the parking lock position P. The hole 108 is provided to accommodate a part of the protrusion 102 in the form of a quadrangular prism, and the above-described spring 110 for biasing the protrusion 102 toward the projection 106 prior to the protrusion 102, so that the protrusion 102 partly protrudes out of the hole 108 toward the projection 106. The protrusion 102 has a slant surface on the side of the fork shaft 58 (on the side of a movement of the fork shaft 58 in a direction to bring the dog clutch D1 in the engaged state), so that a dimension of the protrusion 102 in a direction of movement of the shift fork 62 gradually decreases as the protrusion 102 protrudes toward the projection 106. The protrusion 102 having the slant surface cooperates with the spring 110 to constitute the ratchet device with respect to the hook portion 104 of the detent lever 76 located at the angular position for placing the power transmitting system 16 in the parking lock position P.

In the power transmitting system 16 constructed as described above, the dog-clutch engagement retainer mechanism 100 holds the dog clutch D1 in the engaged state, even when the predetermined hydraulic pressure is not applied to the oil chamber 60a of the actuator 60, that is, even when the engine 12 is held at rest, while the power transmitting system 16 is placed in the parking lock position P, as shown in FIGS. 5A and 5B Further, the biasing action of the spring 60b with respect to the actuator 60 holds the dog clutch D1 in the released state, when the predetermined hydraulic pressure is not applied to the oil chamber 60a of the actuator 60, that is, when the engine 12 is held at rest, while the power transmitting system 16 is placed in any one of the non-parking-lock positions, as shown in FIGS. 6A and 6B. Accordingly, when the vehicle 10 is towed in the neutral position N of the power transmitting system 16 with the engine 12 held at rest, the dog clutch D1 is held in the released state. In addition, the dog clutch D1 is switched between the engaged and released states depending upon whether the predetermined hydraulic pressure is applied to or released from the oil chamber 60a while the engine 12 is in operation in any one of the non-parking-lock positions of the power transmitting system 16.

An example of a control operation of the electronic control device 90 to hold the dog clutch D1 in the engaged state will be described. The electronic control device 90 switches the vehicle drive mode from the high-speed CVT drive mode to the gear drive mode when the electronic control device 90 has determined a requirement for a shift-down action of the power transmitting system 16 as a result of reduction of the vehicle running speed V while the accelerator pedal is in a non-operated state during running of the vehicle 10 in the high-speed CVT drive mode. In this case, the electronic control device 90 first generates a command signal for operating the hub sleeve 54 to switch the dog clutch D1 from the released state to the engaged state, for switching the power transmitting system 16 to the medium-speed CVT drive mode. Then, the electronic control device 90 implements the clutch-to-clutch shift-down action by placing the CVT drive clutch C2 in the released state and placing the forward drive clutch C1 in the engaged state, as indicated in FIG. 2. When the shift lever 72 is then operated to the parking position P after the vehicle 10 is brought to a stop and before the engine 12 is stopped, the detent lever 76 is pivoted to the parking lock position P, and the hook portion 104 is brought into engagement with the projection 102. Thus, the dog clutch D1 is mechanically held in the engaged state in the parking lock position P of the power transmitting system 16, even when the predetermined hydraulic pressure is not applied to the oil chamber 60a of the actuator 60 after the engine 12 is stopped. Accordingly, the vehicle 10 can be speedily started by starting the engine 12 and operating the shift lever 72 from the parking position P to the forward drive position D, while the power transmitting system 16 is placed in the parking lock position P.

When the shift lever 72 is operated to the neutral position N and the vehicle 10 is towed while the dog clutch D1 is held in the engaged state in the parking lock position P of the power transmitting system 16, the detent lever 76 is pivoted to any one of the non-parking lock positions, so that the hook portion 104 is disengaged from the projection 102. As a result, the dog clutch D1 is brought into the released state while the predetermined hydraulic pressure is not applied to the oil chamber 60a of the actuator 60, with the engine 12 held at rest. Accordingly, during towing or traction of the vehicle 10 in the neutral position N of the shift lever 72, it is possible to avoid the rotary motions of the rotary elements (such as the pinion gear) of the planetary gear set 26p at excessively high speeds by the tractive force input through the drive wheels 14. In addition, the ratchet device constituted by the protrusion 102 and the spring 110 permits the movement of the shift fork 62 relative to the hook portion 104 toward the position for placing the dog clutch D1 in the engaged state, when the shift lever 72 is operated from the neutral position N back to the parking position P. Accordingly, the dog clutch D1 is brought into the engaged state when the predetermined hydraulic pressure is applied to the oil chamber 60a of the actuator 60 after the engine 12 is started.

In the power transmitting system 16 according to the present embodiment of the invention, the dog clutch D1 is mechanically held in the engaged state while the power transmitting system 16 is placed in the parking lock position P, so that the dog clutch D1 is kept in the engaged state when the vehicle is started up after releasing the power transmitting system 16 from the parking lock position P with the predetermined hydraulic pressure applied to the oil chamber 60a of the actuator 60 after the engine 12 is started in the parking lock position P, or the synchromesh mechanism S1 and the hub sleeve 54 of the dog clutch D1 remain aligned in phase with each other and are ready for the dog clutch D1 to be placed in the engaged state (i.e., remain aligned as the dog clutch D1 is released), even if the dog clutch D1 is once switched to the released state when the power transmitting system 16 is switched to the non-parking-lock position, whereby the dog clutch D1 can be subsequently speedily brought into the engaged state, without occurrence of the so-called "up-lock". Accordingly, the vehicle 10 can be speedily started after the power transmitting system 16 is switched to the non-parking-lock position. In addition, the dog clutch D1 is not mechanically held in the engaged state while the power transmitting system is placed in the non-parking-lock position, so that it is possible to avoid a large difference among rotating speeds of the rotary elements of the planetary gear set 26p in the released state of the dog clutch D1 when the vehicle 10 is towed in the non-parking-lock position (neutral position N) of the power transmitting system 16. It is therefore possible to prevent a risk of deterioration of durability of the planetary gear set 26p due to its high speed operation during towing of the vehicle 10.

The power transmitting system 16 according to the present embodiment is further configured such that the dog-clutch engagement retainer mechanism 100 mechanically holds the dog clutch D1 in the engaged state, by holding the shift fork 62 and the detent lever 76 in engagement with each other while the shift fork 62 is located at the position for placing the dog clutch D1 in the engaged state and while the detent lever 76 is located at the position for placing the power transmitting system 16 in the parking lock position P. Accordingly, the dog-clutch engagement retainer mechanism 100 mechanically holds the dog clutch D1 in the engaged state in an adequate manner, while the power transmitting system 16 is placed in the parking lock position P, and switches the dog clutch D1 in an adequate manner from the engaged state to the released state when the power transmitting system 16 is switched to the non-parking-lock position.

The power transmitting system 16 according to the present embodiment is further configured such that the protrusion 102 cooperates with the spring 110 to function as the ratchet device which permits the movement of the shift fork 62 relative to the hook portion 104 toward the position for placing the dog clutch D1 in the engaged state, and prevents the movement of the shift fork 62 toward the position for placing the dog clutch D1 in the released state. Accordingly, the dog clutch D1 is mechanically held in the engaged state in an adequate manner while the power transmitting system 16 is placed in the parking lock position P, and the dog clutch D1 is switched in an adequate manner from the engaged state to the released state when the power transmitting system 16 is switched to the non-parking-lock position. In addition, the dog clutch D1 can be switched from the released state to the engaged state even while the detent lever 76 is placed in the angular position for placing the power transmitting system 16 in the parking lock position, so that the dog clutch D1 can be switched from the released state to the engaged state after the power transmitting system 16 is switched to the parking lock position P, when the power transmitting system 16 is switched to the parking lock position after the vehicle 10 has been towed.

The power transmitting system 16 according to the present embodiment is further configured such that the continuously variable transmission 24 and the gear mechanism 28 are disposed in parallel with each other between the input shaft 22 and the output shaft 30, so that the vehicle 10 can be speedily started after the power transmitting system 16 is switched to the non-parking-lock position, and the deterioration of durability of the planetary gear set $26p$ due to towing of the vehicle 10 can be avoided.

While the preferred embodiment of the present invention has been described in detail by reference to the drawings, it is to be understood that the invention may be otherwise embodied.

In the illustrated embodiment, the power transmitting system 16 of the vehicle 10 is provided with the continuously variable transmission 24 and the gear mechanism 28 which are disposed in parallel with each other between the input shaft 22 and the output shaft 30. However, the power transmitting system 16 may be provided with only one power transmitting path having the gear mechanism 28 between the input and output shafts 22 and 30. Namely, the principle of the present invention is applicable to a power transmitting system provided with at least: the differential mechanism (such as the planetary gear set $26p$ provided in the illustrated embodiment) having three rotary elements; the forward drive clutch C1; a power transmitting mechanism (such as the gear mechanism 28 provided in the illustrated embodiment) having a predetermined gear ratio; and the dog clutch D1. In this sense, the power transmitting mechanism may be any type of transmission device other than the gear mechanism 28, for instance, a transmission of a planetary gear type having a plurality of gear positions, and a continuously variable transmission, and the differential mechanism may be a differential gear device having a pinion and a pair of bevel gears meshing with the pinion.

Although the protrusion 102 provided in the illustrated embodiment takes the form of a quadrangular prism, the protrusion 102 may take the form of a cylinder or a triangular prism. In this case, the hole 108 has a cross sectional shape corresponding to the form of the protrusion 102. Further, the protrusion 102, which cooperates with the spring 110 to function as a ratchet device in the illustrated embodiment, need not function to provide a ratchet device. For instance, the protrusion 102 may be replaced by a protrusion which is not biased by the spring 110 and which does not have a slant surface. However, the protrusion 102 preferably function to provide a ratchet device that permits the dog clutch D1 to be switched from the released state to the engaged state when the power transmitting system 16 is switched to the parking lock position P after towing or traction of the vehicle 10.

Although the gear mechanism 28 provided in the illustrated embodiment is a power transmitting mechanism having one gear position having a predetermined gear ratio, the gear mechanism 28 may be replaced by a power transmitting mechanism having a plurality of gear positions having respective different gear ratios γ. That is, the power transmitting mechanism may be a step-variable transmission having two or more gear positions.

Further, the power transmitting system 16 may be selectively switched to the parking lock position P and the non-parking-lock positions with switching operations of the parking lock mechanism 80, in response to an operation of the shift lever 72, in a shift-by-wire (SBW) fashion according to electric control signals. The principle of the invention is applicable to this type of control of the power transmitting system 16.

In the illustrated embodiment, the gear mechanism 28 is a power transmitting mechanism having the gear ratio EL higher than the highest gear ratio value γmax (corresponding to the lowest gear) of the continuously variable transmission 24. However, the gear mechanism 28 may be a power transmitting mechanism having a gear ratio EH lower than a lowest gear ratio value γmin (corresponding to the highest gear) of the continuously variable transmission 24. The principle of the invention is applicable to this type of power transmitting mechanism. This modification also applies to a power transmitting mechanism having a plurality of gear positions.

In the illustrated embodiment, the belt-type continuously variable transmission 24 is provided as a continuously variable transmission mechanism, and the CVT drive clutch C2 is disposed between the continuously variable transmission 24 and the drive wheels 14 (namely, between the secondary pulley 68 and the output shaft 30). However, a troidal type continuously variable transmission may be provided as the continuously variable transmission mechanism. Further, the CVT drive clutch C2 may be disposed between the continuously variable transmission 24 and the engine 12 (namely, between the primary pulley 64 and the input shaft 22).

In the illustrated embodiment, the vehicle drive mode of the power transmitting system 16 is switched according to a predetermined shifting map. However, the vehicle drive mode of the power transmitting system 16 may be switched by calculating a vehicle drive torque required by an operator of the vehicle 10, on the basis of the vehicle running speed V and the accelerator pedal operation amount θacc, and determining the gear ratio that satisfies the calculated required vehicle drive torque.

While the hub sleeve 54 provided in the illustrated embodiment is operated by the hydraulic actuator 60, the hub sleeve 54 may be operated by an electric motor, for example. Further, the dog clutch D1 in which the hub sleeve 54 is kept in engagement with the first gear 50 in the illustrated embodiment may be a dog clutch in which the hub sleeve 54 is kept in engagement with the second gear 52. Further, the dog clutch D1 need not be provided with the synchro-mesh mechanism S1.

In the illustrated embodiment, the engine 12 provided as the drive power source is a gasoline engine, a diesel engine or any other internal combustion engine. However, the drive power source may be any other type of drive power source such as an electric motor or electric motors, or a combination of an engine and an electric motor or electric motors. Further, each of the forward drive clutch C1, the reverse drive brake B1 and the CVT drive clutch C2, which are hydraulically operated frictional coupling devices in the illustrated embodiment, may be an electromagnetic clutch or any other type of frictional clutch.

While the preferred embodiment of the present invention and its modifications have been described for illustrative purpose only, it is to be understood that the invention may be embodied with various other changes and improvements which may occur to those skilled in the art.

NOMENCLATURE OF REFERENCE SIGNS

10: Vehicle
12: Engine (Drive power source)
14: Drive wheels
16: Power transmitting system
22: Input shaft (Input rotary member)
24: Belt-type continuously variable transmission (Continuously variable transmission mechanism)
$26p$: Planetary gear set (Differential mechanism)
$26s$: Sun gear (Output rotary element)
$26c$: Carrier (Input rotary element)
$26r$: Ring gear (Reaction rotary element)
28: Gear mechanism (Power transmitting mechanism)
30: Output shaft (Output rotary member)
62: Shift fork (Clutch switching member)
76: Detent lever (Parking lock switching member)

100: Dog-clutch engagement retainer mechanism
102: Protrusion
104: Hook portion
C1: Forward drive clutch (Clutch mechanism)
C2: CVT drive clutch (First clutch)
D1: Dog clutch

What is claimed is:

1. A power transmitting system of a vehicle, comprising a differential mechanism, a clutch mechanism, a power transmitting mechanism and a dog clutch which are disposed between an input rotary member provided to receive a drive force from a drive power source of the vehicle and an output rotary member provided to transmit the drive force to drive wheels of the vehicle, said differential mechanism including an input rotary element, an output rotary element and a reaction rotary element, said clutch mechanism selectively connecting two rotary elements of said input, output and reaction rotary elements of said differential mechanism, to each other, said power transmitting mechanism having a predetermined gear ratio, and said dog clutch being configured to selectively place a power transmitting path between said output rotary element and said output rotary member, in a power transmitting state and a power cutoff state, and wherein said drive force is transmitted to said drive wheels while both of said clutch mechanism and said dog clutch are placed in engaged states, said power transmitting system further comprising:
a dog-clutch engagement retainer mechanism configured to mechanically hold said dog clutch in the engaged state while the power transmitting system is placed in a parking lock position for mechanically inhibiting a rotary motion of said output rotary member, and to switch said dog clutch from the engaged state to a released state when the power transmitting system is switched to a non-parking-lock position for mechanically permitting the rotary motion of said output rotary member.

2. The power transmitting system according to claim 1, further comprising:
a clutch switching member configured to switch said dog clutch between the engaged state and the released state; and
a parking lock switching member configured to switch the power transmitting system between the parking lock position and the non-parking-lock position,
and wherein said dog-clutch engagement retainer mechanism mechanically holds said dog clutch in the engaged state, by holding said clutch switching member and said parking lock switching member in engagement with each other while the clutch switching member is located at a position for placing the dog clutch in the engaged state and while the parking lock switching member is located at a position for placing the power transmitting system in the parking lock position.

3. A power transmitting system of a vehicle, comprising a differential mechanism, a clutch mechanism, a power transmitting mechanism, a dog clutch, a clutch switching member, and a parking lock switching member, which are disposed between an input rotary member provided to receive a drive force from a drive power source of the vehicle and an output rotary member provided to transmit the drive force to drive wheels of the vehicle, said differential mechanism including an input rotary element, an output rotary element and a reaction rotary element, said clutch mechanism selectively connecting two rotary elements of said input, output and reaction rotary elements of said differential mechanism, to each other, said power transmitting mechanism having a predetermined gear ratio, said dog clutch being configured to selectively place a power transmitting path between said output rotary element and said output rotary member, in a power transmitting state and a power cutoff state, said clutch switching member being configured to switch said dog clutch between an engaged state and a released state, and said parking lock switching member being configured to switch the power transmitting system between a parking lock position for mechanically inhibiting a rotary motion of said output rotary member, and a non-parking-lock position for mechanically permitting the rotary motion of said output rotary member, and wherein said drive force is transmitted to said drive wheels while said clutch mechanism is placed in an engaged state and while said dog clutch is placed in the engaged state, said power transmitting system wherein:
said clutch switching member includes a protrusion;
said parking lock switching member includes a hook portion which is held in engagement with said protrusion of said clutch switching member located at a position for placing said dog clutch in the engaged state when the power transmitting system is placed in the parking lock position, and is not held in engagement with said protrusion when the power transmitting system is placed in the non-parking-lock position; and
said protrusion prevents a movement of said clutch switching member toward a position for placing said dog clutch in the released state, when the protrusion is held in engagement with said hook portion of said parking lock switching member.

4. The power transmitting system according to claim 3, wherein said protrusion functions to provide a ratchet device which permits a movement of said clutch switching member relative to said hook portion toward the position for placing said dog clutch in the engaged state, and prevents the movement of said the clutch switching member toward the position for placing the dog clutch in the released state.

5. The power transmitting system according to claim 1, further comprising a continuously variable transmission disposed in parallel with said power transmitting mechanism, between said input rotary member and said output rotary member, and a first clutch configured to selectively place a first power transmitting path through which the drive force is transmitted from said drive power source to said drive wheels through said continuously variable transmission, in a power transmitting state and in a power cutoff state, and wherein said power transmitting mechanism includes a gear mechanism having at least one gear position, and said differential mechanism is disposed in a second power transmitting path through which the drive force is transmitted from the drive power source to the drive wheels through said power transmitting mechanism, said clutch mechanism selectively places said second power transmitting path in a power transmitting state and in a power cutoff state, and said dog clutch is disposed between said clutch mechanism and said output rotary member, to selectively place said second power transmitting path in said power transmitting and power cutoff states.

6. The power transmitting system according to claim 3, further comprising a continuously variable transmission disposed in parallel with said power transmitting mechanism, between said input rotary member and said output rotary member, and a first clutch configured to selectively place a first power transmitting path through which the drive force is transmitted from said drive power source to said drive wheels through said continuously variable transmission, in a power transmitting state and in a power cutoff state, and wherein said power transmitting mechanism includes a gear mechanism having at least one gear position, and said differential mechanism is disposed in a second power transmitting path through which the drive force is transmitted from the drive power source to the drive wheels through said power transmitting mechanism, said clutch mechanism selectively places said second power transmitting path in a power transmitting state and in a power cutoff state, and said dog clutch is disposed between said clutch mechanism and said output rotary member, to selectively place said second power transmitting path in said power transmitting and power cutoff states.

* * * * *